(12) United States Patent
Oliveira

(10) Patent No.: US 10,420,334 B2
(45) Date of Patent: Sep. 24, 2019

(54) RODENT BARRIER SYSTEM AND METHOD

(71) Applicant: Steven V. Oliveira, San Ardo, CA (US)

(72) Inventor: Steven V. Oliveira, San Ardo, CA (US)

( * ) Notice: Subject to any disclaimer, the term of this patent is extended or adjusted under 35 U.S.C. 154(b) by 300 days.

(21) Appl. No.: 15/467,457

(22) Filed: Mar. 23, 2017

(65) Prior Publication Data

US 2018/0020657 A1    Jan. 25, 2018

Related U.S. Application Data

(60) Provisional application No. 62/364,301, filed on Jul. 19, 2016.

(51) Int. Cl.
| | |
|---|---|
| *B60R 99/00* | (2009.01) |
| *A01M 29/24* | (2011.01) |
| *A01K 15/04* | (2006.01) |
| *A01M 29/30* | (2011.01) |
| *E04H 6/42* | (2006.01) |
| *B66F 7/28* | (2006.01) |

(52) U.S. Cl.
CPC .......... *A01M 29/24* (2013.01); *A01M 29/30* (2013.01); *B66F 7/28* (2013.01); *E04H 6/42* (2013.01)

(58) Field of Classification Search
CPC ...... A01M 29/24; A01M 29/00; A01M 29/30; A01M 19/00; B60R 2099/005; A01K 15/04

See application file for complete search history.

(56) References Cited

U.S. PATENT DOCUMENTS

| | | | | |
|---|---|---|---|---|
| 520,510 | A | * | 5/1894 | Wilson ................ A01K 15/04 256/14 |
| 4,949,216 | A | | 8/1990 | Djukastein |
| 6,450,483 | B1 | * | 9/2002 | Baum ................ A01K 3/005 256/1 |
| 7,299,586 | B2 | * | 11/2007 | Lawson, Jr. ......... A01M 29/24 43/98 |
| 8,939,110 | B2 | * | 1/2015 | Hazlehurst ........... A01K 3/002 119/712 |
| 2004/0200439 | A1 | | 10/2004 | Thomas et al. |
| 2011/0214339 | A1 | | 9/2011 | Donoho |
| 2012/0127624 | A1 | | 5/2012 | Ritson |

FOREIGN PATENT DOCUMENTS

| | | | | |
|---|---|---|---|---|
| CA | 2448544 A1 | * | 5/2005 | ............ A01M 29/30 |
| CA | 2886321 A1 | * | 4/2013 | ............ A01K 3/002 |
| DE | 9405347 U1 | * | 5/1994 | ............ A01M 29/24 |
| DE | 202013100909 U1 | * | 3/2013 | ............ B60R 99/00 |

* cited by examiner

*Primary Examiner* — Kristen C Hayes
(74) *Attorney, Agent, or Firm* — Integrity Patent Group, PLC; Charles E. Runyan

(57) ABSTRACT

A rodent barrier system is disclosed herein. The rodent barrier system includes a vehicle elevation platform, a perimeter ladder having a plurality of rungs, a right ramp, and a left ramp. The rodent barrier system is useful for deterring rodents from accessing a vehicle.

18 Claims, 5 Drawing Sheets

RODENT BARRIER SYSTEM AND METHOD

CROSS-REFERENCE TO RELATED APPLICATION

The present application is related to and claims priority to U.S. Provisional Patent Application No. 62/364,301 filed Jul. 19, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of rodent deterrents, and more specifically relates to a nonlethal rodent deterrents.

2. Description of Related Art

Generally, rodents or pests may access a vehicle and ruin the wiring and upholstery. Most rodent control devices involve traps, poison, repellant spays, etc. It may be common to use mats having electric charges. However, mats may be disadvantages in that the vehicle is on ground level, thus allowing an easier obstacle for rodents. Furthermore, utilizing a lethal electric charge may require unpleasant disposal of the rodents' bodies.

U.S. Pat. No. 7,299,586 to Lawson relates to an antipest mat. The described antipest mat includes the antipest mat which protects vehicles against entry by small animals by giving the animals a deterrent electrical shock. The mat is made up of two sections joined together to form a closed shape with an open area in the middle. The sections are connected together at a pivot point that allows the mat to be opened so that it can be placed around a vehicle support point, such as a tire, and then closed to completely surround the vehicle support point. The upper insulative surface of the mat sections holds a pattern of closely spaced conductors. The conductors are arranged so that adjacent conductors are of opposite or differing polarities. The conductors are connected to one or more connectors. A source of electric power is provided to energize the conductors so that an animal contacting two or more adjacent conductors receives an electric shock.

BRIEF SUMMARY OF THE INVENTION

In view of the foregoing disadvantages inherent in the known non-lethal rodent deterrent art, the present disclosure provides a novel platform barrier utilizing non-lethal electricity. The general purpose of the present disclosure, which will be described subsequently in greater detail, is to provide a rodent barrier system and method.

A rodent barrier system is disclosed herein. The rodent barrier system includes a vehicle elevation platform that may include a right side member, a left side member, and a first adjustable cross member coupling the right side member to the left side member. The right side member may be configured to support front and back wheels of the right side of the vehicle at a platform elevation. Furthermore, the left side member may be configured to support front and back wheels of the left side of the vehicle at the platform elevation. Additionally, the vehicle elevation platform includes a right ramp, separated from the right side member, may be configured to elevate the front and back wheels of the right side of the vehicle from a ground level to the platform elevation when driven up the right ramp. Also the vehicle elevation platform includes a left ramp, separated from the left side member, may be configured to elevate the front and back wheels of the left side of the vehicle from the ground level to the platform elevation when driven up the left ramp. The vehicle elevation platform further includes a perimeter ladder forming a barrier around the right side member and the left side member, respectively. The perimeter ladder may include a plurality of rungs configured for a rodent to climb up the rungs. Moreover, the rungs may be configured to impart a nonlethal electric charge to the rodent when at least two rungs are contacted by the rodent.

According to another embodiment, a method of using a rodent barrier system is also disclosed herein. The method of using a rodent barrier system includes activating the rodent barrier system by driving a vehicle onto the vehicle elevation platform, and deactivating the rodent barrier system by driving a vehicle off the vehicle elevation platform, or optionally activating the rodent barrier system by utilizing a user interface, and optionally deactivating the rodent barrier system by utilizing a user interface.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a rodent barrier system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a nonlethal electrified platform for rodent deterrence. Unlike electrified mats utilizing a lethal electric, here, the rodent barrier system may repel rodents, and require little to no maintenance to operate the device.

Figure 1:
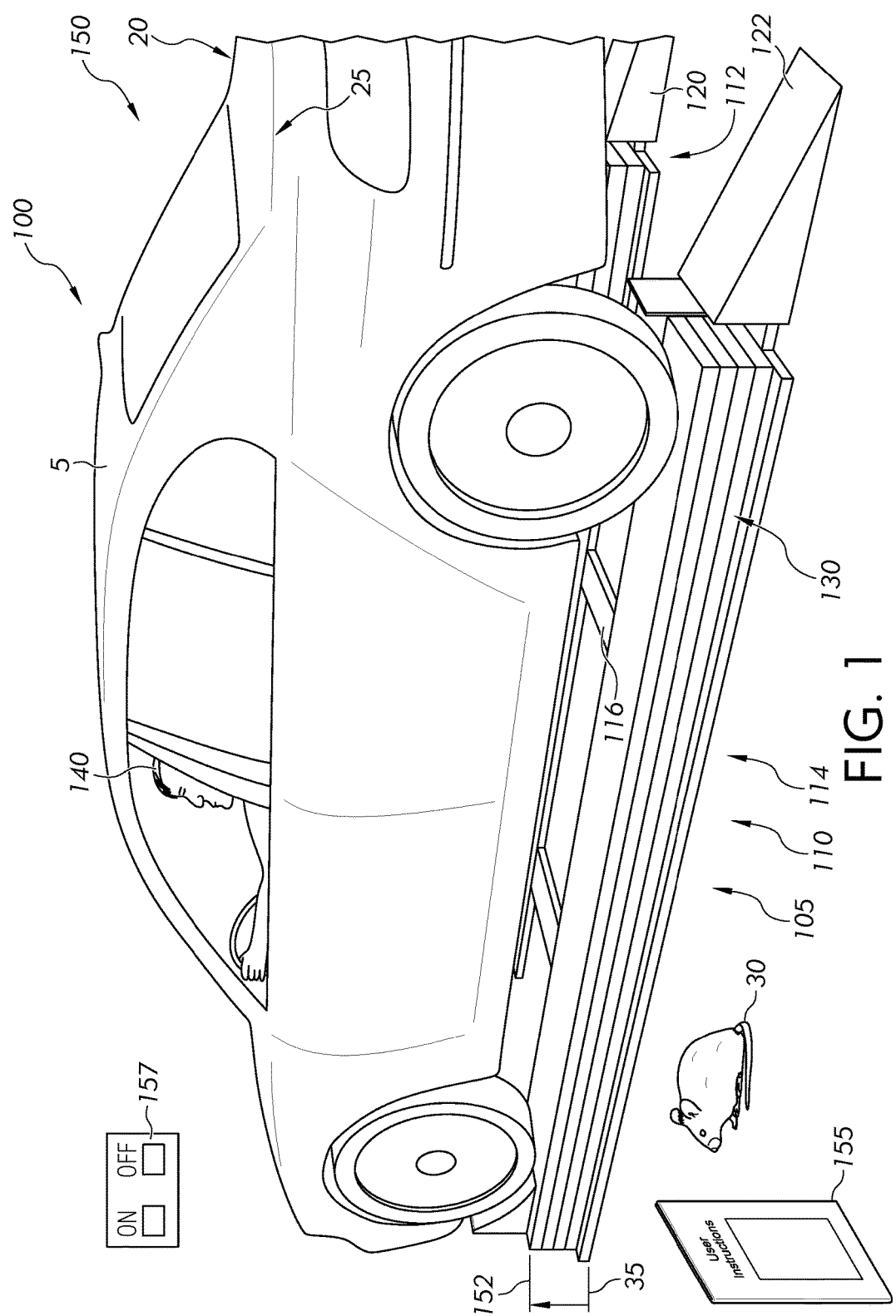
FIG. 1 is a perspective view of the rodent barrier system during an 'in-use' condition, according to an embodiment of the disclosure.

Referring now more specifically to the drawings by numerals of reference, there is shown in FIGS. 1-4, various views of a rodent barrier system 100. FIG. 1 shows the rodent barrier system 100 during an 'in-use' condition 150, according to an embodiment of the present disclosure. Here, the rodent barrier system 100 may be beneficial for use by a user 140 to deter a rodent 30 from accessing a vehicle 5 by utilizing nonlethal electricity. As illustrated, the rodent barrier system 100 may include a vehicle elevation platform 110 that may include a right side member 112, a left side member 114, and a first adjustable cross member 116 coupling the right side member 112 to the left side member 114. One or more adjustable cross members 116 may be utilized to expand the width of the vehicle elevation platform 110 for accommodating a variety of sized vehicles. The right side member 112 may be configured to support front and back wheels of the right side 20 of the vehicle 5 at a platform elevation 152. Furthermore, the left side member 114 may be configured to support front and back wheels of the left side 25 of the vehicle 5 at the platform elevation 152.

Additionally, a right ramp 120, separated from the right side member 112, may be configured to elevate the front and back wheels of the right side 20 of the vehicle 5 from a ground level 35 to the platform elevation 152 when driven up the right ramp 120. A left ramp 122, separated from the left side member 114, may be configured to elevate the front and back wheels of the left side 25 of the vehicle 5 from the ground level 35 to the platform elevation 152 when driven up the left ramp 122.

The vehicle elevation platform 110 may further include an electrified barrier or fence (e.g., a perimeter ladder 130) circumscribing the right side member 112 and the left side member 114, respectively. The perimeter ladder 130 may include a plurality of alternating polarity strips (rungs 132) configured for a rodent 30 to climb up the rungs 132. Moreover, the rungs 132 may be configured to impart a nonlethal electric charge to the rodent 30 when at least two rungs 132 are contacted by the rodent 30. The plurality of rungs 132 may be made of conductive material, such as aluminum, so that the electric charge delivered may be nonlethal.

The plurality of rungs 132 may be automatically activated upon detection of the vehicle 5 being present on the rodent barrier system. Micro-switches (not shown) may be included in the vehicle elevation platform 110 to automatically activate the plurality of rungs 132. However, a user interface 157 (i.e. control switch) may be provided and configured to manually activate or deactivate the plurality of rungs 132.

According to one embodiment, the rodent barrier system 100 may be arranged as a kit 105. In particular, the rodent barrier system 100 may further include a set of instructions 155. The instructions 155 may detail functional relationships in relation to the structure of the rodent barrier system 100 (such that the rodent barrier system 100 can be used, maintained, or the like, in a preferred manner).

Figure 2:
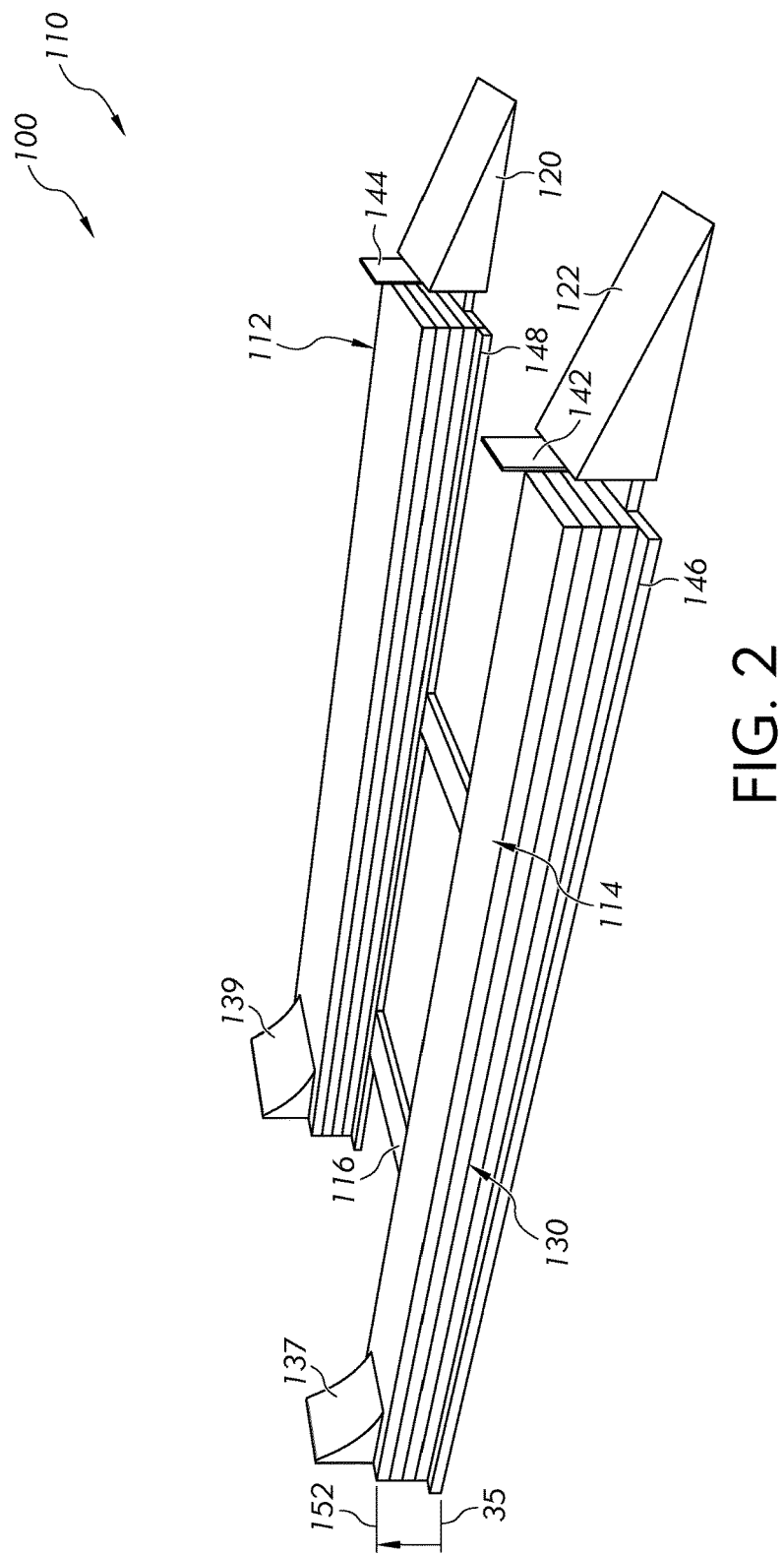
FIG. 2 is a perspective view of the rodent barrier system of FIG. 1, according to an embodiment of the present disclosure.

FIG. 2 shows the rodent barrier system of FIG. 1, according to an embodiment of the present disclosure. As above, the rodent barrier system 100 may include the vehicle elevation platform 110 that may include the right side member 112, the left side member 114, and at least one adjustable cross member (e.g., first adjustable cross member 116) coupling the right side member 112 to the left side member 114. The right side member 112 may be configured to support front and back wheels of the right side 20 (FIG. 1) of the vehicle 5 (FIG. 1) at the platform elevation 152. Furthermore, the left side member 114 may be configured to support front and back wheels of the left side 25 (FIG. 1) of the vehicle 5 (FIG. 1) at the platform elevation 152. Additionally, the right ramp 120, separated from the right side member 112, may be configured to elevate the front and back wheels of the right side 20 (FIG. 1) of the vehicle 5 from the ground level 35 to the platform elevation 152 when driven up the right ramp 120. The left ramp 122, separated from the left side member 114, may be configured to elevate the front and back wheels of the left side 25 of the vehicle 5 from the ground level 35 to the platform elevation 152 when driven up the left ramp 122.

The vehicle elevation platform 110 may further include the perimeter ladder 130 forming the barrier around the right side member 112 and the left side member 114, respectively. The perimeter ladder 130 may include the plurality of rungs 132 configured for the rodent 30 (FIG. 1) to climb up the rungs 132. Moreover, the rungs 132 may be configured to impart the nonlethal electric charge to the rodent 30 when at least two rungs 132 are contacted by the rodent 30.

The left side member 114 and the right side member 112 of the vehicle elevation platform 110 may include a left chock 137 and a right chock 139, respectively. The left chock 137 and the right chock 139 may be positioned opposite the left side member 114 and the right side member 112 from the left ramp 122 and the right ramp 120, respectively. The left chock 137 and the right chock 139 may be configured to inhibit the vehicle 5 (shown in FIG. 1) from rolling off the left side member 114 and the right side member 112 after driving up, the left ramp 122 and the right ramp 120, respectively.

Furthermore, the left ramp 122 and the right ramp 120 may include a left side flap 142 and a right side flap 144, respectively. The left side flap 142 and the right side flap 144 may be located proximate the left ramp 122 and the right ramp 120, respectively. The left side flap 142 and the right side flap 144 may be configured to inhibit the rodent 30 from crossing from the left ramp 122 and the right ramp 120 on to the left side member 114 and the right side member 112. Moreover, the left side flap 142 and the right side flap 144 may be composed of material that is flexible configured to allow the vehicle 5 to pass over.

The left side member 114 and the right side member 112 may further include a left base 146 and a right base 148, respectively. The left base 146 and the right base 148 may each be configured as a first step extending horizontally from the left side member 114 and the right side member 112, respectively. The left base 146 and the right base 148 may also include an upper surface having conductive material configured to deliver a nonlethal charge, and each surface may be configured to operate as a bottom rung. In this regard, once the rodent has made contact with the left base 146 or the right base 148, only one rung of the plurality of rungs 132 requires contact in order to deliver the nonlethal charge to the rodent 30.

Figure 3:
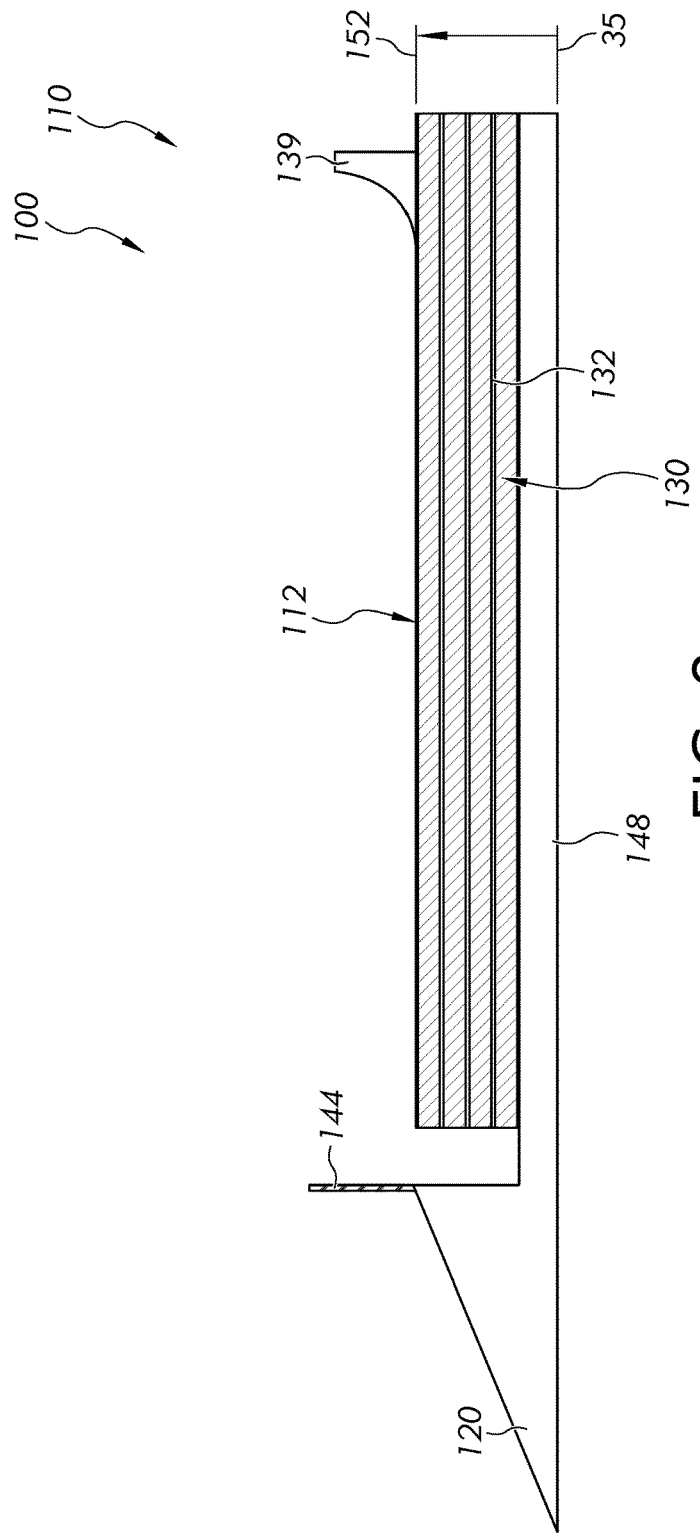
FIG. 3 is a side view of the rodent barrier system of FIG. 1, according to an embodiment of the present disclosure.

FIG. 3 is a side view of the rodent barrier system 100 of FIG. 1, according to an embodiment of the present disclosure. As shown in FIG. 3, the right ramp 120 may be coupled to the right side member 112 via the right base 148, while the right ramp 120 may be otherwise separated from the right side member 112 such that the rodent 30 (FIG. 1) may be inhibited from walking up the right ramp 120 and across to the right side member 112. Similarly, the left ramp 122 (FIG. 2) may be coupled to the left side member 114 (FIG. 2) via the left base 146 (FIG. 2), while the left ramp 122 may be otherwise separated from the left side member 114 such that the rodent 30 may be inhibited from walking up the left ramp 122 and across to the left side member 114.

Furthermore, adjacent rungs of the plurality of rungs 132 may alternate in polarity allowing at least two rungs of the plurality of rungs 132 to be contacted in order to deliver the nonlethal charge. The plurality of rungs 132 may be recessed within the left side member 114 and the right side member 112, and adjacent rungs may be separated by at least 0.12 inch. The plurality of rungs 132 may be arranged to lie flushed with the left side member 114 (see e.g., FIG. 4) and the right side member 112. According to one embodiment, the platform elevation 152 of the vehicle elevation platform 110 may be at least four inches tall from ground level 35.

Figure 4:
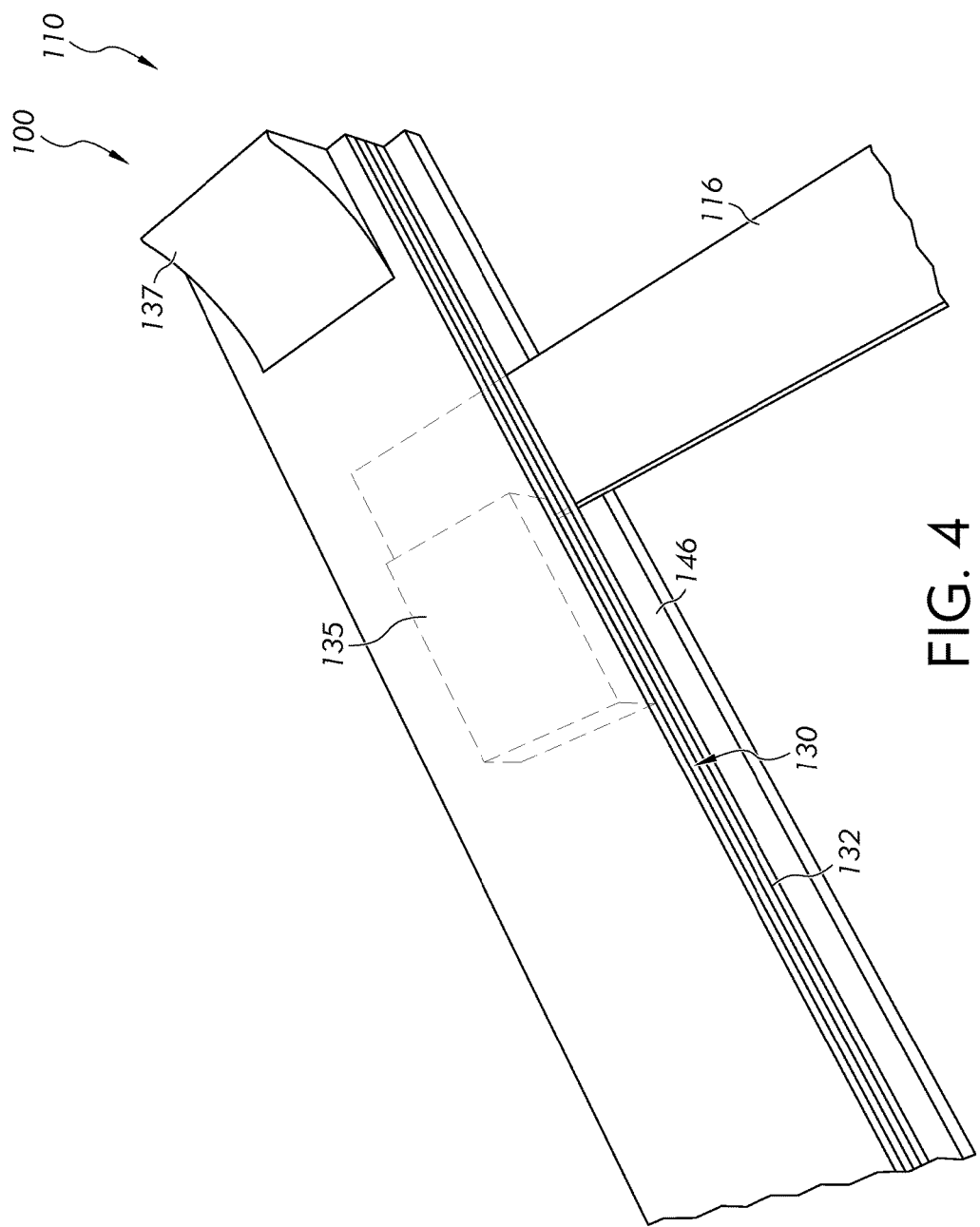
FIG. 4 is a top perspective view of the rodent barrier system of FIG. 1, according to an embodiment of the present disclosure.

FIG. 4 is a top perspective view of the rodent barrier system 100 of FIG. 1, according to an embodiment of the present disclosure. The rodent barrier system 100 may further include a power source 135 located within the vehicle elevation platform 110, and configured to deliver the nonlethal electric charge to the plurality of rungs 132. The power source 135 may include a battery and/or a power converter (not shown) configured to convert external alternating current (AC) to direct current (DC). The power source 135 may further include an independent DC power supply (not shown), such as solar panels, that may be configured to charge the battery.

Figure 5:
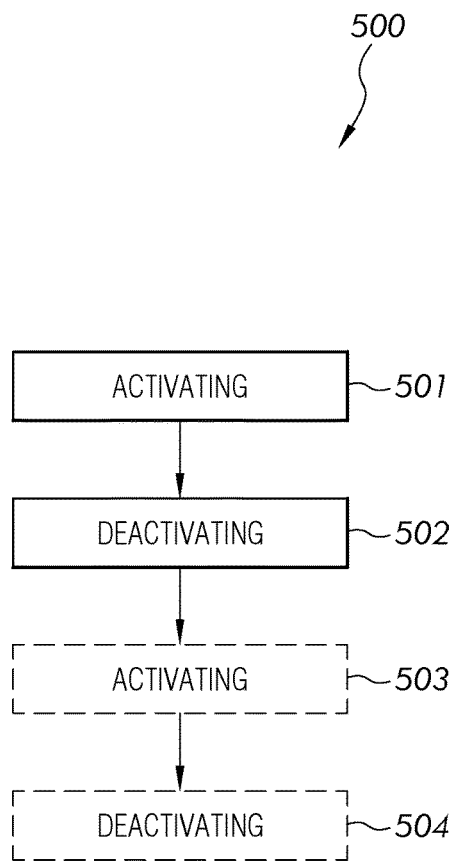
FIG. 5 is a flow diagram illustrating a method of using the rodent barrier system, according to an embodiment of the present disclosure.

FIG. 5 is a flow diagram illustrating a method using a rodent barrier system 500, according to an embodiment of the present disclosure. In particular, the method for using a rodent barrier system 500 may include one or more components or features of the rodent barrier system 100 as described above and illustrated in FIGS. 1-4. As illustrated, the method for using the rodent barrier system 500 may include the steps of: step one 501, activating the rodent barrier system 100 by driving the vehicle 5 onto the vehicle elevation platform 110; step two 502, deactivating the rodent barrier system 100 by driving the vehicle 5 off the vehicle elevation platform 110; step three 503, activating the rodent barrier system 100 by utilizing the user interface 157; and step four 504, deactivating the rodent barrier system 100 by utilizing the user interface 157.

It should be noted that steps three and four are optional and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the rodent barrier system 100 (e.g., different step orders within above-mentioned list, elimination or addition of certain steps, including or excluding certain maintenance steps, etc.), are taught herein.

Upon reading this specification, it should be appreciated that, under appropriate circumstances, considering such issues as user preferences, design preference, structural requirements, marketing preferences, cost, available materials, technological advances, etc., other arrangements such as, for example, the plurality of rungs 132, etc., may be sufficient. Arrangements may include separating the plurality of rungs 132 from being flushed with the left side member 114 and the right side member 112. Such an arrangement may allow for a variety of positions for the plurality of rungs 132 (i.e. the top rung of the plurality of rungs 132 may be further recessed than the bottom rung of the plurality of rungs 132)

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A rodent barrier system for a vehicle, the vehicle having a front, a back, a right side and a left side, the rodent barrier system comprising:
    a vehicle elevation platform including a right side member, a left side member, and a first adjustable cross member coupling the right side member to the left side member, the right side member configured to support front and back wheels of the right side of the vehicle at a platform elevation, the left side member configured to support front and back wheels of the left side of the vehicle at the platform elevation;
    a right ramp, separated from the right side member, and configured to elevate the front and back wheels of the right side of the vehicle from a ground level to the platform elevation when driven up the right ramp;
    a left ramp, separated from the left side member, and configured to elevate the front and back wheels of the left side of the vehicle from the ground level to the platform elevation when driven up the left ramp; and
    a perimeter ladder forming a barrier around the right side member and the left side member, respectively, the perimeter ladder including a plurality of rungs configured for a rodent to climb up the rungs, the rungs configured to impart a nonlethal electric charge to the rodent when at least two rungs are contacted by the rodent.

2. The rodent barrier system of claim 1, further comprising a power source located within the vehicle elevation platform, and configured to deliver the nonlethal electric charge to the plurality of rungs.

3. The rodent barrier system of claim 2, wherein the power source includes a battery and a power converter configured to convert external alternating current (AC) to direct current (DC).

4. The rodent barrier system of claim 3, wherein the power source further includes an independent DC power supply configured to charge the battery.

5. The rodent barrier system of claim 1, wherein the plurality of rungs are automatically activated upon detection of the vehicle being present on the rodent barrier system.

6. The rodent barrier system of claim 1, further comprising a user interface configured to manually activate or deactivate the plurality of rungs.

7. The rodent barrier system of claim 1, wherein adjacent rungs of the plurality of rungs alternate in polarity.

8. The rodent barrier system of claim 1, wherein the plurality of rungs are recessed within the left side member and the right side member, and adjacent rungs are separated by at least 0.12 inch.

9. The rodent barrier system of claim 1, wherein the vehicle elevation platform is at least four inches tall from ground level.

10. The rodent barrier system of claim 1, wherein the left side member and the right side member include a left chock and a right chock, respectively, said left chock and said right chock positioned opposite the left side member and the right side member from the left ramp and the right ramp, respectively, and said left chock and said right chock configured to inhibit the vehicle from rolling off the left side member and the right side member after driving up, the left ramp and the right ramp, respectively.

11. The rodent barrier system of claim 10, wherein the left side flap and the right side flap are further configured to allow the vehicle to pass over.

12. The rodent barrier system of claim 1, wherein the left ramp and the right ramp include a left side flap and a right side flap, respectively, said left side flap and said right side flap located proximate the left ramp and the right ramp, respectively, and said left side flap and said right side flap configured to inhibit the rodent from crossing from the left ramp and the right ramp on to the left side member and the right side member.

13. The rodent barrier system of claim 1, wherein the plurality of rungs are made of conductive material.

14. The rodent barrier system of claim 1, wherein the left side member and the right side member include a left base and a right base, respectively, the left base and the right base each configured as a first step extending horizontally from the left side member and the right side member, respectively.

15. The rodent barrier system of claim 14, wherein the left base and the right base include a surface having conductive material configured to deliver a nonlethal charge, and each surface is configured to operate as a bottom rung.

16. The rodent barrier system of claim 14, wherein the right ramp is coupled to the right side member on the right base, while the right ramp is otherwise separated from the right side member such that the rodent is inhibited from walking up the right ramp and across to the right side member; and
wherein the left ramp is coupled to the left side member on the left base, while the left ramp is otherwise separated from the left side member such that the rodent is inhibited from walking up the left ramp and across to the left side member.

17. A rodent barrier system, the rodent barrier system comprising:
a vehicle elevation platform including right side member, a left side member, and a first adjustable cross member coupling the right side member to the left side member, the right side member configured to support front and back wheels of the right side of the vehicle at a platform elevation, the left side member configured to support front and back wheels of the left side of the vehicle at the platform elevation;
a right ramp, separated from the right side member, and configured to elevate the front and back wheels of the right side of the vehicle from a ground level to the platform elevation when driven up the right ramp;
a left ramp, separated from the left side member, and configured to elevate the front and back wheels of the left side of the vehicle from the ground level to the platform elevation when driven up the left ramp;
a perimeter ladder forming a barrier around the right side member and the left side member, respectively, the perimeter ladder including a plurality of rungs configured for a rodent to climb up the rungs, the rungs configured to impart a nonlethal electric charge to the rodent when at least two rungs are contacted by the rodent; and
a power source located within the vehicle elevation platform, and configured to deliver the nonlethal electric charge to the plurality of rungs;
wherein the power source includes a battery and a power converter configured to convert external alternating current (AC) to direct current (DC);
wherein the power source further includes an independent DC power supply configured to charge the battery;
wherein the plurality of rungs are automatically activated upon detection of the vehicle being present on the rodent barrier system;
wherein adjacent rungs of the plurality of rungs alternate in polarity;
wherein the plurality of rungs are recessed within the left side member and the right side member, and adjacent rungs are separated by at least 0.12 inch;
wherein the vehicle elevation platform is at least four inches tall from ground level;
wherein the left side member and the right side member include a left chock and a right chock, respectively, said left chock and said right chock positioned opposite the left side member and the right side member from the left ramp and the right ramp, respectively, and said left chock and said right chock configured to inhibit the vehicle from rolling off the left side member and the right side member after driving up, the left ramp and the right ramp, respectively;
wherein the left ramp and the right ramp include a left side flap and a right side flap, respectively, said left side flap and said right side flap located proximate the left ramp and the right ramp, respectively, and said left side flap and said right side flap configured to inhibit the rodent from crossing from the left ramp and the right ramp on to the left side member and the right side member;
wherein the left side flap and the right side flap are further configured to allow the vehicle to pass over;
wherein the plurality of rungs are made of conductive material;
wherein the left side member and the right side member include a left base and a right base, respectively, the left base and the right base each configured as a first step extending horizontally from the left side member and the right side member, respectively;
wherein the left base and the right base include a surface having conductive material configured to deliver a nonlethal charge, and each surface is configured to operate as a bottom rung;
wherein the right ramp is coupled to the right side member on the right base, while the right ramp is otherwise separated from the right side member such that the rodent is inhibited from walking up the right ramp and across to the right side member; and
wherein the left ramp is coupled to the left side member on a left base, while the left ramp is otherwise separated from the left side member such that the rodent is inhibited from walking up the left ramp and across to the left side member.

18. The rodent barrier system of claim 17, further comprising set of instructions; and
wherein the rodent barrier system is arranged as a kit.

* * * * *